INVENTORS
Günter Wendel
Jean Wiemer

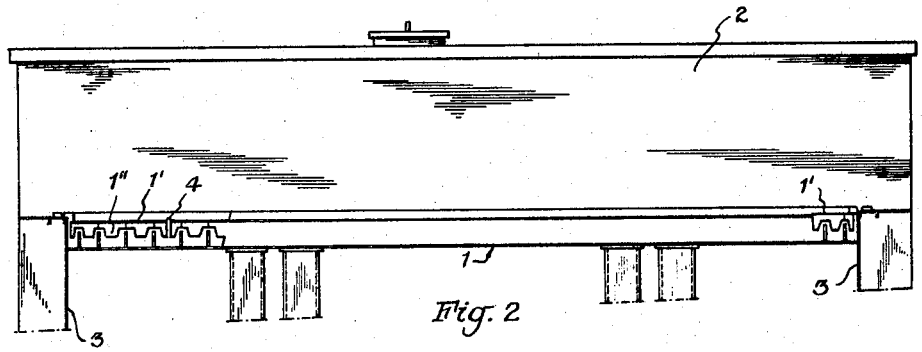
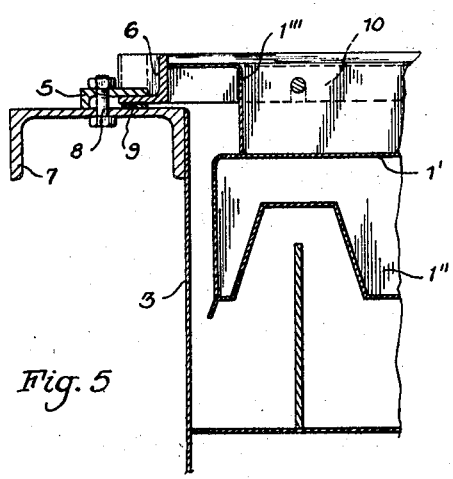
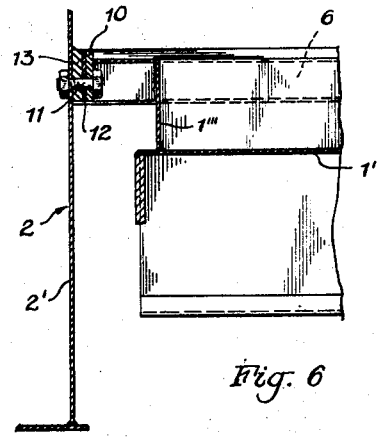
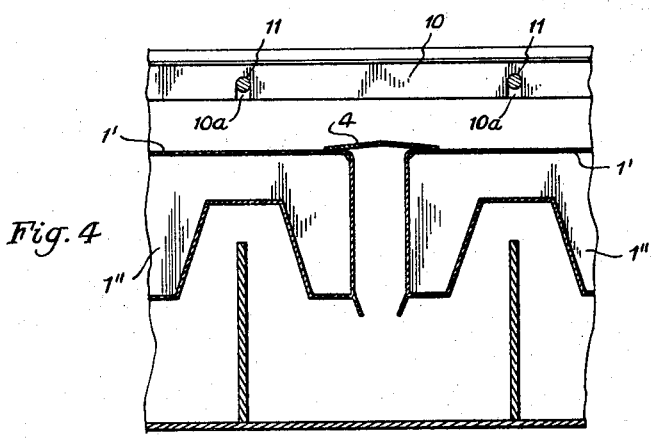

United States Patent Office 3,386,215
Patented June 4, 1968

3,386,215
BLOW-OUT ROOF FOR ELECTROSTATIC
DUST SEPARATOR
Günter Wendel, Frankfurt am Main, and Jean Wiemer, Oberhochstadt, Taunus, Germany, assignors to Metallgesellschaft Aktiengesellschaft, Frankfurt am Main, Germany
Filed Jan. 23, 1967, Ser. No. 610,867
Claims priority, application Germany, Jan. 29, 1966, M 68,185
1 Claim. (Cl. 52—1)

ABSTRACT OF THE DISCLOSURE

The roof sheets of an electrostatic dust separator are connected to each other by plates capable of being deformed by the pressure of an explosion in the separator, and to the side walls and roof beams by joints which are released by the explosion.

When combustible or explosive gases are being cleaned in an electrostatic dust separator, explosions often happen and cause considerable damage to the outer walls of the separator and the interior installations therein. Prevention of such explosions is possible in only a few cases because the unintentional formation of an explosion mixture of combustible gas and air cannot be either seldom or completely controlled. Also, it is not possible to calculate the rise in pressure produced by an explosion in the interior of the separator for the purpose of providing against the damage of explosions in the design or construction of the separator. The type of explosions herewith concerned are chemical reactions which produce large increases in volume at high velocities and whose starting point can never be predicted.

Conventionally the structural safety measures used are rupture discs, membranes or explosion baffles in constructing the separator. The determination of the size of such safety measures is exceedingly difficult and usually only previous experiences are available for design purposes and are so insufficient as to require the use of a certain amount of guess work. Purchasers of electrostatic dust precipitators or separators and conventional safety regulations require a certain number of explosion baffles or the like per each given volume of dust removal. Aside from the increased use of construction material and the increase in cost of the precipitators which result from such safety requirements, there remains the fact that the installation of explosion openings places a considerable load on the stability of construction. For example, the load carrying characteristics of the separator walls will have their stability changed by the safety installations and difficulties increase in the erection of the apparatus.

The object of this invention is to avoid the aforesaid disadvantages in constructing a steel electrostatic dust separator in which the exterior walls and interior installations are protected against damage from explosions by using the roof as a pressure release means. The roof is releasably joined to the exterior wall of the separator.

In this invention, the roof is composed of a plurality of roof sheets which have their adjacent edges joined by a welded strip of metal bent at an obtuse angle. One end edge of each sheet is welded to an angle iron which is clamped by means of a further angle iron to the exterior wall of the separator with an appropriate seal in the joint. The other end of the sheet is welded to a flat iron strip which is joined to another flat iron strip fastened to the roof beam with a seal in the joint.

The roof of this invention satisfies the requirement that the roof of the separator is absolutely sealed, while at the same time the joints between the exterior walls and roof beams is such that the roof in its entirety acts as a safety valve for blasts or explosions occurring in the separator. Thus, in this invention, the entire roof functions as the rupture membrane for the entire separator. It opens a path for the relief of the explosive pressure and thus prevents or reduces to a minimum any damage to the separator or the walls of the same.

The cover plates have special importance in the roof of this invention. The form of the plates is such that they are especially bendable with regard to explosive pressures. When an explosion occurs in the separator, the pressure is always directed from the inside to the outside so that the cover plates are bent outwardly along their longitudinal axis while at the same time they remain welded to the adjacent roof sheets. The bending of the cover plates thus causes a shortening of the length of the roof so that the roof is lifted by the explosive pressures without difficulty.

The means by which the objects of the invention are obtained are described more fully with reference to the accompanying drawings in which:

FIGURE 2 is a cross-sectional view taken on the line 2—2 of FIGURE 1;

FIGURE 4 is a cross-sectional view showing the cover plate joining adjacent roof sheets;

FIGURE 5 is a cross-sectional view showing the joint between the roof sheets and the exterior wall of the separator; and FIGURE 6 is a cross-sectional view showing the joint between the roof sheets and the roof beams.

Figure 1:
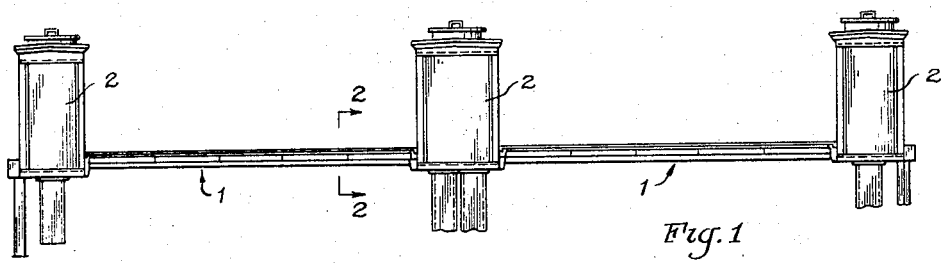
FIGURE 1 is a cross-sectional view through the roof of the electrostatic separator.
Figure 3:
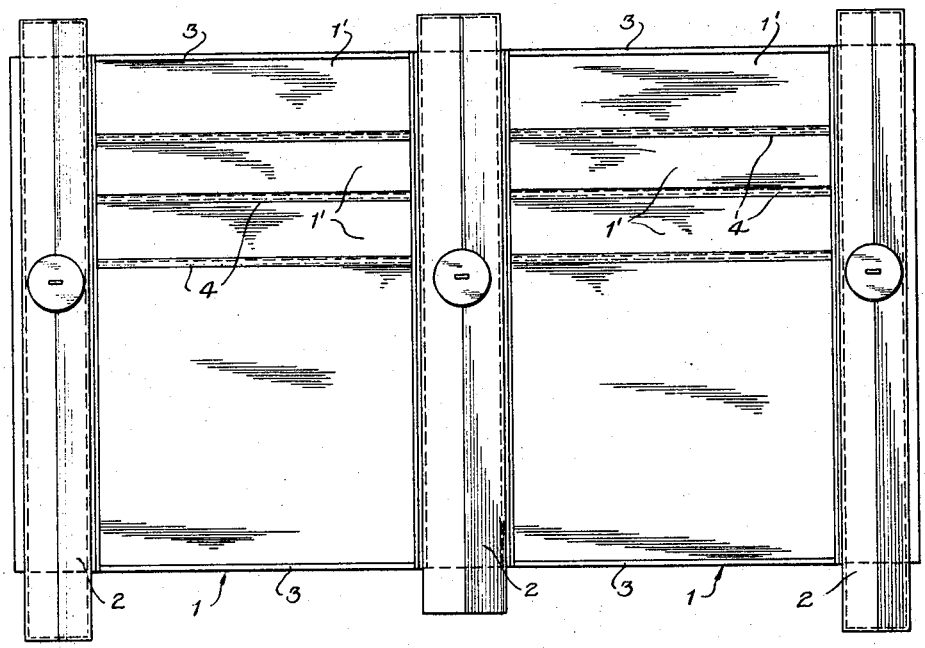
FIGURE 3 is a plan view of FIGURE 1.

The roof 1 extends between the roof beams 2 and the exterior walls 3 and is composed of metal having a thickness of approximately 3 mm. It is designed so that it is stable against greater than or less than atmospheric pressures but is yieldable under blasts or explosions. Depending upon the width of the separator, the roof is divided into a plurality of relatively smaller sheets 1'. These sheets can be reinforced by being welded to members 1''. Adjacent sheets are joined by a bendable cover plate 4 approximately 3 mm. thick which is welded to the tops of adjacent sheets in order to make the roof leakproof. Plate 4, which is called a shock deformable cover plate, is bent at a slight obtuse angle in the form of the ridge of a roof in its entire length. This produces a shape which is yieldable under explosive pressures. The V-shaped plate 4 is welded to the roof sheets 1' as a V-shaped bendable plate pointed upwardly. This is in the direction of the pressure rising in the interior of the separator when an explosion occurs. Under explosive pressures, the pre-bent plate 4 bends further so that the individual roof sheets 1' are drawn closer together so that the length of the roof is shortened. This shortening causes the ends of the roof sheets to pull out of their joints with the exterior walls 3 and are unfastened from their joints with the roof beams and thus open a path for the relief of the explosion pressures in the entire separator as the roof is lifted from the separator.

The roof sheets 1' are clamped and/or pressed against the exterior walls 3 and the roof beams 2 without being tightly screwed, welded or riveted thereto.

FIGURE 5 shows the joint between the roof sheet 1' and the exterior wall 3. The end of roof sheet 1' is extended by an angular element 1''' having the same thickness as that of the sheet 1'. The outer edge of element 1''' is welded to an angle iron 6. The lower flange of this angle iron is held by a clamping angle iron 5 by means of bolts 8 so that it is secured to a channel iron 7 which forms the upper edge of wall 3. A sealing strip 9 is positioned between the flange of angle iron 6 and the channel iron 7. This produces an airtight seal of the upper edge of the roof with the side wall 3, while at the same time, the angle iron 6 can be withdrawn from the joint.

FIGURE 6 shows the joint between the roof sheets and the roof beams 2. The roof sheet 1' is extended by the element 1''' to a flat iron strip 10. On the vertical side wall 2' of the roof beam 2 is a corresponding flat iron strip 13. These two strips are connected by bolts 11 with a sealing member 12 in the joints thus formed. Strip 10 is provided with slots 10a through which bolts 11 extend so that when an explosion occurs with the separator the roof sheets are lifted and the strip 10 pulled out of the joint.

The dust separator roof of this invention forms both the structural roof and the seal for the separator. Moreover, this roof functions as a relief valve for the entire separator when an explosion occurs therein. Experience has shown that this is very satisfactory since the pressure is always relieved in an upward direction. The roof sheets lie above the force field in a separator having precipitating electrodes. These electrodes, in the shape of plates or tubes, in most cases, prevent a relief of pressure not only toward the precipitator walls, but also give the pressure wave a direction of movement toward the roof. As contrasted to previous constructions which generally have heavy and rigid roofs, this invention has the advantage that the roof is of lightweight, but nevertheless strong enough to withstand greater than and less than atmospheric pressures. The roof is easily constructed and replaced. It is a sufficient safety measure for blasts and explosions. It eliminates the necessity for other types of safety measures.

Having now described the means by which the objects of the invention are obtained.

We claim:

1. In an electrostatic dust separator, a roof construction for the relief of gas pressures caused by an explosion in the separator and for protecting the walls and inner parts of the separator from damage comprising a plurality of roof sheets supported on roof beams, upwardly pointed V-shaped bendable cover plates joining the side edges of adjacent sheets by welds, angle irons joined to one of the ends of said sheets, flat iron strips joined to the other ends of said sheets, slots in said flat iron strips, and bolt means engaged in said slots for holding releasably sealed said iron strips to said roof beams.

References Cited

UNITED STATES PATENTS

| | | | |
|---|---|---|---|
| 1,240,773 | 9/1917 | Perry | 52—469 |
| 1,298,129 | 3/1919 | Whittredge | 52—261 X |
| 2,104,500 | 1/1938 | Van Buren | 52—283 X |
| 3,258,887 | 7/1966 | Mostoller | 52—98 |
| 3,332,175 | 7/1967 | Hawes et al. | 52—1 |

HENRY C. SUTHERLAND, *Primary Examiner.*